Feb. 4, 1936.                M. D. PRINCE                2,029,671
                          SEPARATING DEVICE
                        Filed April 13, 1935
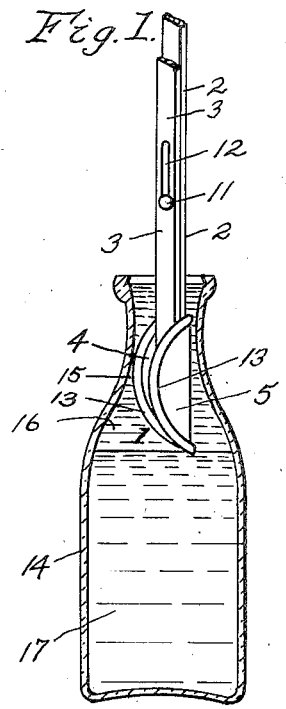
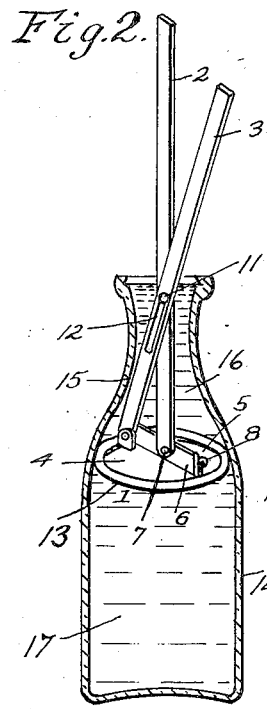
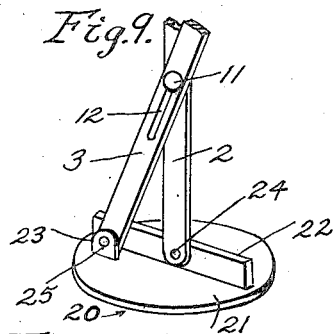
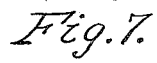
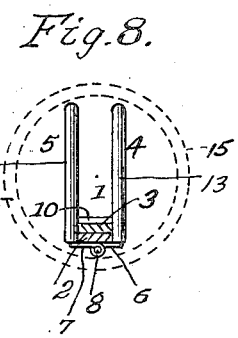
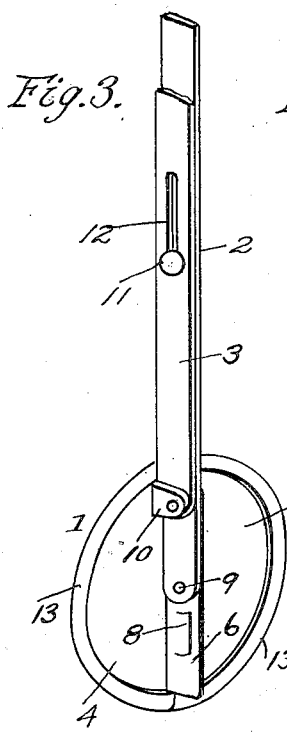
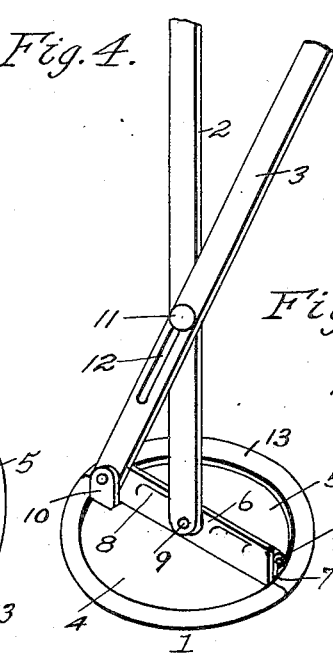
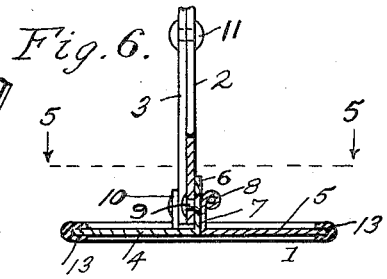
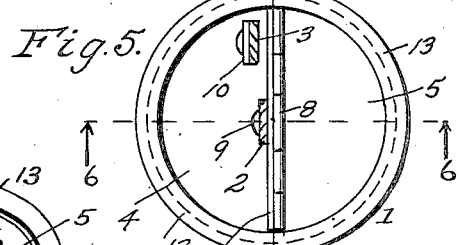
INVENTOR:
MARIUS. D. PRINCE.
BY Alan Franklin
ATTORNEY.

Patented Feb. 4, 1936

2,029,671

UNITED STATES PATENT OFFICE 2,029,671

SEPARATING DEVICE

Marius D. Prince, Los Angeles, Calif.

Application April 13, 1935, Serial No. 16,231

3 Claims. (Cl. 210—51.5)

This invention relates to a device for separating liquids in a receptacle, and more particularly to a device for separating cream from milk in a milk bottle, so that the cream may be poured out of the bottle without pouring out the milk.

The general object of the invention is to provide a separating device which may be readily inserted into a milk bottle and positioned therein for separating the cream from the milk, and for maintaining the milk in the bottle while the cream is poured out of the bottle, and which device may be readily removed from the bottle when the cream has been poured out of the bottle.

Another object is to provide a device of the character stated which is simple in construction, inexpensive, and practical and efficient in operation.

Other objects and advantages will appear hereinafter.

The invention is illustrated in the annexed drawing which forms a part of this specification and in which, Fig. 1 is a perspective of my invention shown completely collapsed and in the act of being inserted into a milk bottle through the neck thereof, said bottle being shown in section.

Fig. 2 is a perspective of my invention shown extended into and expanded in a milk bottle, with its separating member engaging the wall of the bottle and separating the cream in the upper part of the bottle from the milk in the lower part of the bottle, said bottle being shown in section.

Fig. 3 is a perspective of my invention shown partly collapsed.

Fig. 4 is a perspective of my invention shown expanded.

Fig. 5 is a horizontal section of my invention taken on line 5—5 of Fig. 6.

Fig. 6 is a fragmentary longitudinal section of my invention in expanded position, taken on line 6—6 of Fig. 5.

Fig. 7 is a fragmentary rear view of my invention in collapsed position, as illustrated in Fig. 1.

Fig. 8 is a horizontal section of my invention taken on line 8—8 of Fig. 7, and showing the same within the neck of a milk bottle shown in dotted lines.

Fig. 9 is a fragmentary perspective of a modified form of my invention.

Referring more particularly to the drawing, in which corresponding parts are designated by the same reference characters in all of the views thereof, my invention includes a separating member 1 and a pair of levers 2 and 3.

The separating member 1 comprises a pair of semi-circular plates or leaves 4 and 5, which are bent at right angles along their diameters in the form of flanges 6 and 7, and said leaves are hinged together along said flanges by a hinge 8, so that said leaves may be unfolded into alignment with each other into disk formation, as illustrated in Figs. 2 to 6 inclusive of the drawing, or folded one-over-the-other in spaced parallel relation, as illustrated in Figs. 1, 7 and 8 of the drawing.

The lever 2 is pivoted at one end, as at 9, to the flange 6 of the leaf 4 of the separating member 1, while one end of the lever 3 is pivoted at one end to a lug 10 projecting from said leaf 4 and spaced a short distance from said flange 6, so that the lever 2 may swing between said flange and the lever 3, as illustrated in Figs. 3, 5, 6 and 8 of the drawing. A rivet 11 is secured in the lever 2 and extends through a longitudinal slot 12 in the lever 3, whereby said levers are slidably pivoted together, to permit the same to be swung together and the separating member 1 to be swung on the lever pivots 9 and 10 in parallel relation to said levers, as illustrated in Figs. 1, 3, 7 and 8, or to permit said levers to be swung apart and said separating member to be swung on said pivots 9 and 10, at right angles to the lever 2 and at an angle to lever 3, as illustrated in Figs. 2, 4, 5, 6 and 9. Over the edges of the leaves 4 and 5 of the separating member 1 is fitted a split rubber sealing ring 13 for engaging the inner surface of the neck of a milk bottle, in the manner hereinafter described.

The operation of my invention is as follows:

The levers 2 and 3 being swung together and the separating member 1 being swung with its leaf 4 against one of the edges of said levers, in parallel relation thereto, as illustrated in Fig. 3, the leaf 5 of said separating member is swung on the hinge 8 over the leaf 4 against the opposite edges of said levers, as illustrated in Figs. 1, 7 and 8 of the drawing, in which position the separating member 1 is introduced into the milk bottle 14 through the restricted neck thereof, as illustrated in Figs. 1 and 8 of the drawing. The levers 2 and 3 are then swung apart on their pivot 11, whereupon the separating member 1 is swung on its pivots 9 and 10 at right angles to the lever 2 and at an angle to the lever 3, as illustrated in Fig. 2 of the drawing. The device is then elevated until the rubber sealing ring 13 on the edge of the separating member 1 engages the inner surface of the lower portion of the neck 15 of the bottle 14, at the lower level of the cream 16 in the upper part of the bottle, and the separating member 1 divides the cream from the milk 17 in the lower part of the bottle, as illustrated in Fig. 2 of the drawing. Upon holding the device in this position in the bottle, the bottle may be tipped and the cream poured out of the bottle through the mouth thereof without pouring out the milk, the separating member 1 shutting the milk in the lower part of the bottle. The device may then be removed from the bottle 14 by first lowering the same in the bottle, then swinging the levers 2 and 3 together and the separating member 1 into parallel relation to said levers, and then turning the device slightly to the left and withdrawing the device from the bottle through the neck 15 thereof, the leaf 5 of said separating member during such operation engaging the inner surface of the neck and folding over the leaf 4, as illustrated in Fig. 1, to enable the separating member to pass through said neck.

In the modified form of my invention illustrated in Fig. 9 of the drawing the separating member 20 comprises a rubber disk 21 formed with a diametrical flange 22 and a lug 23 on one side thereof, to which flange one end of the lever 2 is pivoted as at 24, and to which lug one end of lever 3 is pivoted, as at 25. The flexibility of the disk 21 permits the disk to bend sufficiently to enable the same to pass through the neck 15 of the bottle 14 for inserting the separating member 20 into the bottle or removing said member from the bottle.

I claim as my invention:

1. A separating device comprising a separating member formed in two leaves hinged together to be swung into alignment with each other or folded one over the other, a pair of levers pivoted at one end to one of said leaves, and a pivot secured in one of said levers and extending through a longitudinal slot in said other lever to permit said levers to be swung together and said separating member to be swung parallel to said levers, or to permit said levers to be swung apart and said separating member to be swung at right angles to one of said levers.

2. A separating device comprising a rubber disk separating member, a pair of levers, one of said levers being pivoted at one end to the center of said separating member, the other lever being pivoted at one end to said separating member at the edge thereof, one of said levers having a longitudinal slot therein, and a pivot secured in the other lever and extending through said slot.

3. A separating device comprising a separating member formed in two semi-circular leaves bent at right angles along their diameters respectively in the form of flanges, said flanges being hinged longitudinally together so that said leaves may be unfolded into alignment with each other into disk formation, or folded one-over-the-other into spaced parallel relation, a pair of levers, one of said levers being pivoted to the flange of one of said leaves at the center of said leaf, the other lever being pivoted to said leaf near the outer edge thereof, and means for slidably pivoting said levers together to be swung apart, when said leaves are unfolded into alignment with each other, and to be swung together to enable said leaves to be folded one-over-the-other in spaced parallel relation, with said levers between said leaves.

MARIUS D. PRINCE.